(12) United States Patent
Emori

(10) Patent No.: US 11,467,371 B2
(45) Date of Patent: Oct. 11, 2022

(54) IMAGING DEVICE AND CONTROL METHOD THEREOF

(71) Applicant: SONY CORPORATION, Tokyo (JP)

(72) Inventor: Tomoyuki Emori, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 69 days.

(21) Appl. No.: 17/040,637

(22) PCT Filed: Feb. 5, 2019

(86) PCT No.: PCT/JP2019/003956
§ 371 (c)(1),
(2) Date: Sep. 23, 2020

(87) PCT Pub. No.: WO2019/187646
PCT Pub. Date: Oct. 3, 2019

(65) Prior Publication Data
US 2021/0011255 A1 Jan. 14, 2021

(30) Foreign Application Priority Data

Mar. 30, 2018 (JP) .............................. JP2018-070274

(51) Int. Cl.
H04N 5/232 (2006.01)
G02B 7/36 (2021.01)

(52) U.S. Cl.
CPC ........... G02B 7/36 (2013.01); H04N 5/23212 (2013.01)

(58) Field of Classification Search
CPC .................................................. H04N 5/23212
USPC ........................................................ 348/345
See application file for complete search history.

(56) References Cited

U.S. PATENT DOCUMENTS

2010/0141796 A1* 6/2010 Haruta ............. H04N 5/232123
348/E9.053
2016/0295100 A1 10/2016 Yokozeki et al.

FOREIGN PATENT DOCUMENTS

| CN | 103312965 A | 9/2013 |
| CN | 105025290 A | 11/2015 |
| CN | 106060373 A | 10/2016 |
| CN | 107454308 A | 12/2017 |
| DE | 102016105764 A1 | 10/2016 |

(Continued)

OTHER PUBLICATIONS

Office Action for CN Patent Application No. 201980021548.5, dated Sep. 3, 2021, 11 pages of English Translation and 08 pages of Office Action.

(Continued)

Primary Examiner — Joel W Fosselman
(74) Attorney, Agent, or Firm — Chip Law Group

(57) ABSTRACT

Provided are an imaging device and a control method thereof for calculating an amount of tilt of an image sensor and an amount of deviation in a flange focal distance and presenting the amounts to a user. The imaging device acquires, for every one of a plurality of small areas in an imaging region of the image sensor, data regarding a focus position and a focusing degree of a lens by performing AF demodulation following movement of the focus position manually operated by the user, and calculates an amount of tilt of the image sensor or an amount of deviation in a flange focal distance of the lens on the basis of a cross-correlation of the data regarding the focus position and the focusing degree between the plurality of small areas.

12 Claims, 11 Drawing Sheets

(56) References Cited

FOREIGN PATENT DOCUMENTS

| GB | 2539996 A | 1/2017 |
|---|---|---|
| JP | 10-197226 A | 7/1998 |
| JP | 2006-319544 A | 11/2006 |
| JP | 2007-295240 A | 11/2007 |
| JP | 2010-011042 A | 1/2010 |
| JP | 2013-037246 A | 2/2013 |
| JP | 2013-187883 A | 9/2013 |
| JP | 2016-197177 A | 11/2016 |
| JP | 2017-191144 A | 10/2017 |

OTHER PUBLICATIONS

International Search Report and Written Opinion of PCT Application No. PCT/JP2019/003956, dated May 14, 2019, 10 pages of ISRWO.

* cited by examiner

AMOUNT OF TILT
AMOUNT OF DEVIATION IN
FLANGE FOCAL DISTANCE
500μm

0μm

IMAGING DEVICE AND CONTROL METHOD THEREOF

CROSS REFERENCE TO RELATED APPLICATIONS

This application is a U.S. National Phase of International Patent Application No. PCT/JP2019/003956 filed on Feb. 5, 2019, which claims priority benefit of Japanese Patent Application No. JP 2018-070274 filed in the Japan Patent Office on Mar. 30, 2018. Each of the above-referenced applications is hereby incorporated herein by reference in its entirety.

TECHNICAL FIELD

The technology disclosed in the present specification relates to an imaging device that presents a state of a tilt of an image sensor or a deviation in a flange focal distance to a user and to a control method thereof.

BACKGROUND ART

Digital imaging devices that use imaging elements such as CCDs and CMOSs are widely distributed for general users and for business such as filming of a movie or a drama.

It is necessary to arrange an imaging surface of an imaging element perpendicularly to an optical axis of a lens barrel of a lens, but there is a concern that the imaging surface may incline with respect to the optical axis, that is, a "tilt" phenomenon may occur. Furthermore, it is necessary that a subject image focused by an imaging lens be formed as the image on the imaging surface of the imaging element, but there is a concern that the subject image may not be correctly formed as the image due to a deviation in a flange focal distance (distance from a lens mount surface to the imaging surface). The tilt and the deviation in the flange focal distance described above are phenomena that often occur due to deterioration over time, especially in interchangeable-lens cameras.

For example, for a device having an optical system and imaging means, a technology for testing perpendicularity of an imaging target surface with respect to an optical axis of the optical system or the imaging means has been proposed (for example, see Patent Document 1). However, the technology assumes that the test is performed in a place in which a device for acquiring an image and an arithmetic device are prepared separately from an imaging device such as a camera, and a measurement environment is prepared in advance.

Furthermore, for testing of inclinations of imaging elements in a digital camera manufacturing process, a measurement device that detects a quantitative inclination and finely adjusts a position where the imaging element is attached has been proposed (for example, see Patent Document 2). It is assumed that measurement by the measurement device is performed with a measurement chart attached to a drive mechanism, but such a drive mechanism cannot always be prepared in an environment where a user uses an imaging device.

Furthermore, a method and a device for correcting a tilt of an imaging device that correct an inclination of an imaging element with respect to an optical axis direction have been proposed (for example, see Patent Document 3). When the correction method is used to correct the inclination of the imaging element, it is necessary to arrange discretely a plurality of tilt correction elements around the optical axis and drive them.

CITATION LIST

Patent Document

Patent Document 1: Japanese Patent Application Laid-Open No. H10-197226
Patent Document 2: Japanese Patent Application Laid-Open No. 2006-319544
Patent Document 3: Japanese Patent Application Laid-Open No. 2010-11042

SUMMARY OF THE INVENTION

Problems to be Solved by the Invention

It is an object of the technology disclosed in the present specification to provide an imaging device that presents, to a user, a state of a tilt of an image sensor or a deviation in a flange focal distance and to provide a control method thereof.

Solutions to Problems

A first aspect of the technology disclosed in the present specification provides
an imaging device including:
a measurement unit that acquires data regarding a focus position and a focusing degree of a lens for every one of a plurality of small areas in an imaging region of an image sensor; and
an arithmetic unit that calculates an amount of tilt of the image sensor or an amount of deviation in a flange focal distance of the lens on the basis of a correlation of the data regarding the focus position and the focusing degree between the plurality of small areas.

The measurement unit measures focusing degree data for each focus position by performing AF demodulation following movement of the focus position manually operated by a user. Furthermore, the measurement unit acquires the data with nothing missed out using a captured image obtained by high-speed imaging of the image sensor.

The imaging device further includes an output unit that outputs the amount of tilt or the amount of deviation in the flange focal distance calculated by the arithmetic unit. The output unit causes an image in which the amount of tilt is represented by color density or color shade to be superimposed and displayed on the captured image. Furthermore, the output unit outputs numerical information regarding the amount of tilt or the amount of deviation in the flange focal distance in a case where the amount of tilt or the amount of deviation in the flange focal distance is out of an allowable range.

Furthermore, a second aspect of the technology disclosed in the present specification provides
a method of controlling an imaging device, the method including:
a measurement step of acquiring data regarding a focus position and a focusing degree of a lens for every one of a plurality of small areas in an imaging region of an image sensor;
an arithmetic step of calculating an amount of tilt of the image sensor or an amount of deviation in a flange focal distance of the lens on the basis of a correlation of the data regarding the focus position and the focusing degree between the plurality of small areas; and an output step of outputting the amount of tilt or the amount of deviation in the flange focal distance calculated by the arithmetic unit.

Effects of the Invention

According to the technology disclosed in the present specification, it is possible to provide an imaging device and a control method thereof that can present, to a user, a state of a tilt of an image sensor or a deviation in a flange focal distance, following a focus operation performed by a user.

Note that the effects described herein are merely illustrative, and the effects of the present invention are not limited thereto. Furthermore, the present invention may exhibit additional effects besides the effects described above in some cases.

Other objects, features, and advantages of the technology disclosed in the present specification will become apparent from the detailed description based on the embodiment described later and the accompanying drawings.

MODE FOR CARRYING OUT THE INVENTION

An embodiment of the technology disclosed in the present specification will be described below in detail with reference to the drawings.

A. System Configuration

Figure 1:
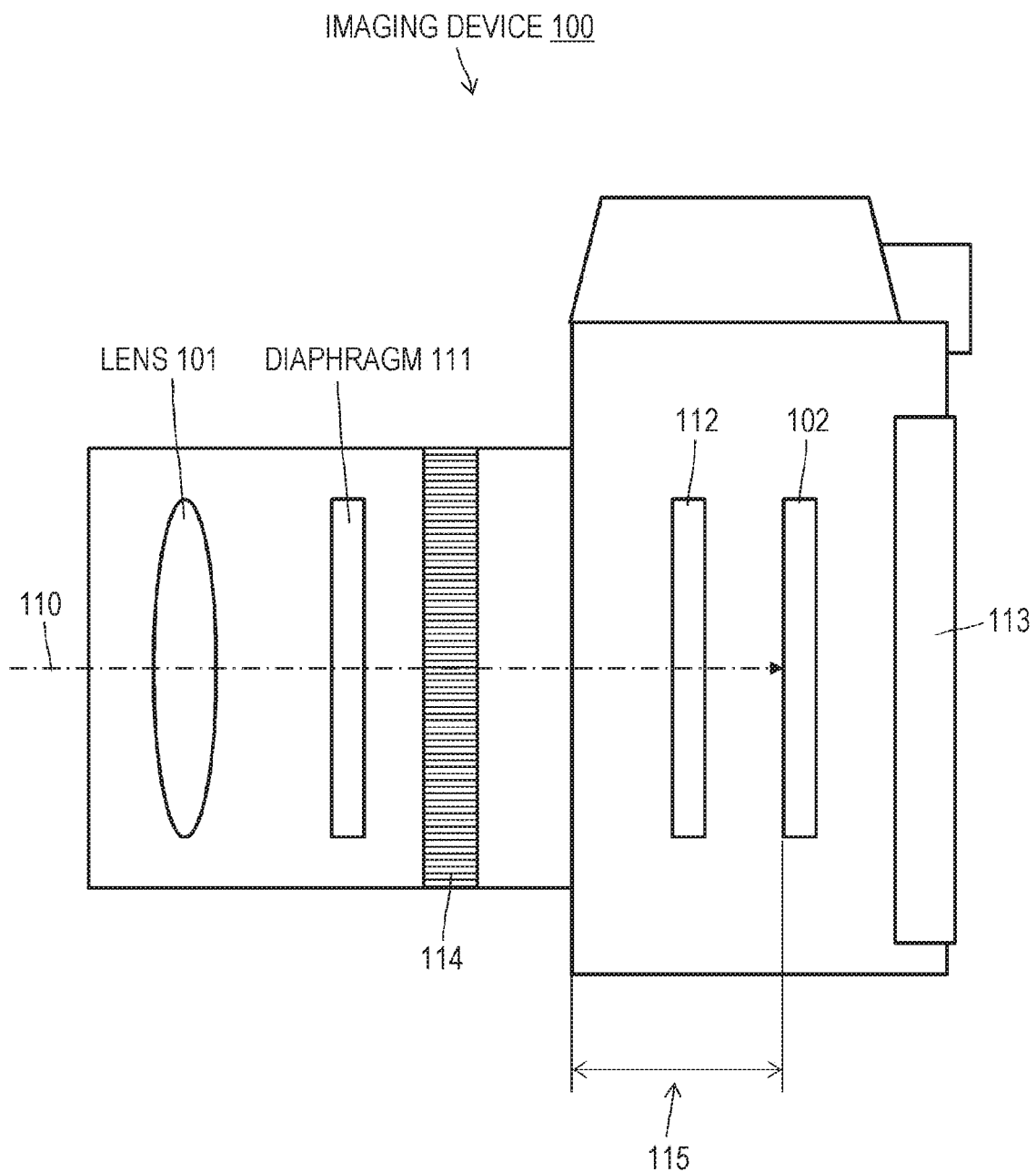
FIG. 1 is a diagram illustrating a configuration of an imaging device 100.

FIG. 1 schematically illustrates a cross section of a main body of an imaging device 100 along an optical axis direction 110. Note that this figure shows only some of its parts for convenience of description.

A lens 101, a diaphragm 111, a shutter 112, and an image sensor 102 are arranged in this order along the optical axis direction 110. Furthermore, a display unit 113 is provided on a back surface of the main body of the imaging device 100. The image sensor 102 is constituted by an imaging element such as a CMOS or a CCD that generates an electric signal in accordance with an amount of received light. The display unit 113 is constituted by, for example, a liquid crystal panel, an organic electroluminescent device (OLED), or the like. Furthermore, a touch panel is superimposed on a surface of the display unit 113, and the display unit 113 can also be used as a user interface.

Note that a circuit module that performs operation control of the diaphragm 111 and the shutter 112 (that is, exposure and shutter timing control), processing of an image signal captured by the image sensor 102, and the like is omitted in FIG. 1.

The lens 101 is actually constituted by one or a plurality of lenses supported in a lens barrel. Furthermore, a focus ring 114 for manually operating a focus position is provided on an outer circumference of the lens 101 (or the lens barrel). The focus ring 114 can be rotated in a circumferential direction of the lens 101, and the focus position of the lens 101 moves substantially linearly in accordance with an amount of rotation of the focus ring 114 with respect to an optical axis. A user can rotate the focus ring 114 to move the focus position from one end to the other. Note that the means for a user to manually operate the focus position may be in a form other than the focus ring 114.

In the present embodiment, it is assumed that the lens 101 is an interchangeable lens. A reference numeral 115 indicates a "flange focal distance," which is a distance from a mount surface of the interchangeable lens 101 to an imaging surface of the image sensor 102. Generally, the length of the flange focal distance is strictly defined by a lens mount standard. Furthermore, the imaging surface of the image sensor 102 needs to be perpendicular to the optical axis 110 of the lens 101.

However, in a case where the lens 101 is interchangeable, there is a concern that repeated removal and replacement of the lens 101 from the main body of the imaging device 100 and deterioration over time may result in phenomena such as a change in the length of the flange focal distance and an inclination of the imaging surface of the image sensor 102 with respect to the perpendicularity to the optical axis 110 of the lens 101. The change in the length of the flange focal distance is called the deviation in the flange focal distance. Furthermore, the inclination of the imaging surface of the image sensor 102 with respect to the optical axis 110 of the lens 101 from the optical axis of the lens 101 is called a tilt.

Figure 2:
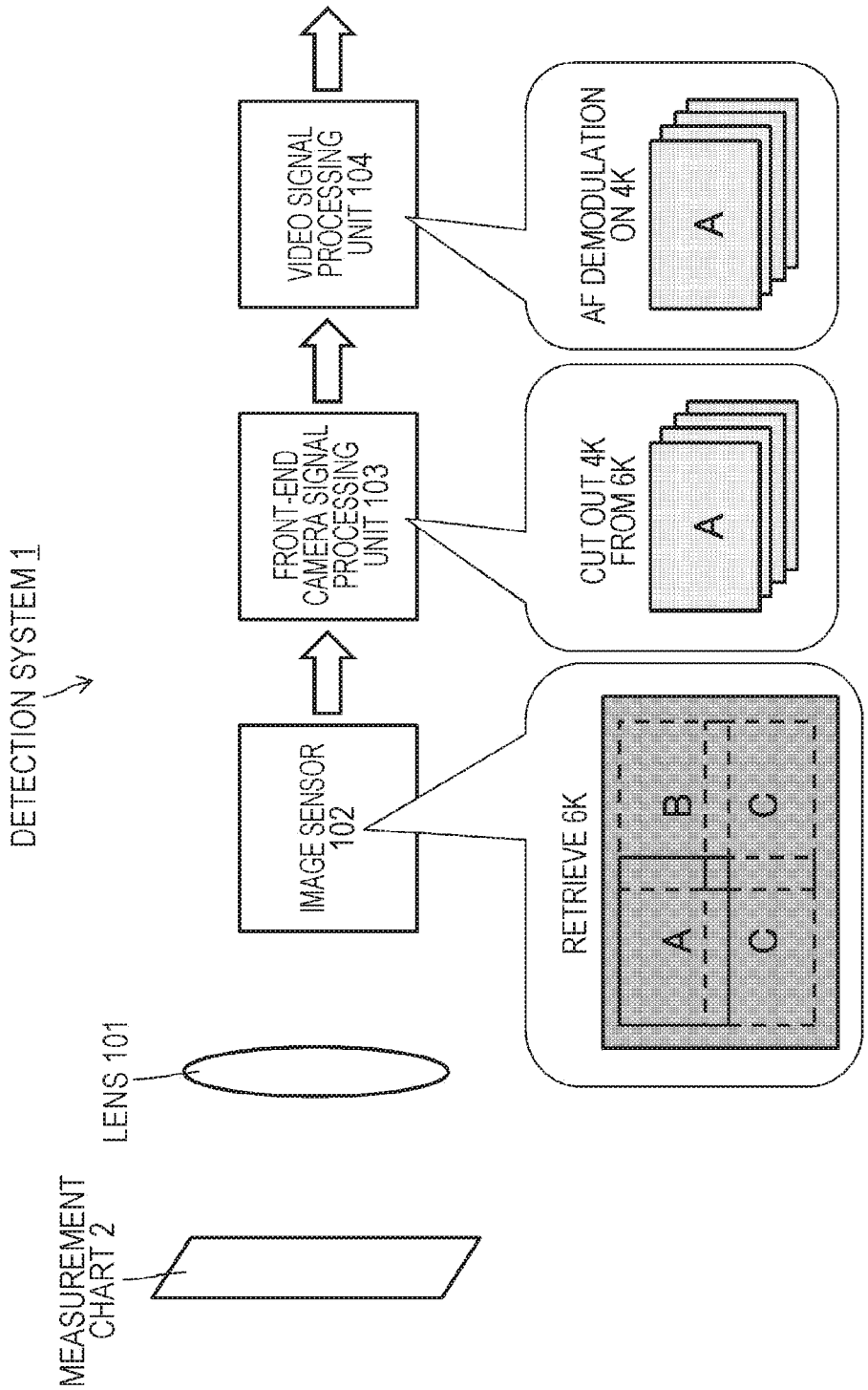
FIG. 2 is a diagram schematically illustrating a configuration of a detection system 1.

FIG. 2 schematically illustrates a configuration of a detection system 1 for detecting the tilt and the amount of deviation in the flange focal distance of the imaging device 100.

The imaging device 100 for which a detection is to be performed includes the lens 101, the image sensor 102, a front-end camera signal processing unit 103, and a video signal processing unit 104. The imaging device 100 is a so-called digital camera capable of capturing moving images and still images. The imaging device 100 may further include components such as a control unit that performs controls such as control of shutter operation and exposure, control of display of a captured image on a display unit, and control of recording of a captured image on a recording medium, a display unit arranged on the back surface of the main body or the like, and the recording medium, but such components are omitted from the drawing for simplification of the description.

The front-end camera signal processing unit 103 performs, on an image signal output from the image sensor 102, processing such as noise removal processing such as correlated double sampling (CDS), automatic gain control (AGC) processing for setting the image signal to a desired signal level, and an analog-to-digital conversion of the analog image signal into a digital signal.

The video signal processing unit 104 performs, on an image signal on which an analog-to-digital conversion has been performed, correction processing such as defect correction and shading correction, camera signal processing such as white balance adjustment, luminance correction, and demosaicing, resolution conversion, compression/expansion processing, and the like. In the present embodiment, the video signal processing unit 104 is assumed to further include an AF demodulation circuit that performs AF demodulation processing for detecting a state of a focus.

The front-end camera signal processing unit 103 and the video signal processing unit 104 are each constituted by a large scale integration (LSI). Alternatively, the front-end camera signal processing unit 103 and the video signal processing unit 104 may be combined and constituted by a single LSI.

At every replacement of the lens 101 in the main body of the imaging device 100, the lens 101 needs to be attached so that the optical axis of the lens 101 is perpendicular to the imaging surface of the image sensor 102, and that a subject image focused by the lens 101 is correctly formed as the image on the imaging surface of the image sensor 102. However, when the lens 101 has been continuously replaced, there is a concern that deterioration over time may result in phenomena such as a "tilt," which is an inclination of the imaging surface of the image sensor 102 with respect to the optical axis of the lens 101, and a change in the distance between the mount surface of the lens 101 and the imaging surface of the image sensor 102 (flange focal distance) (described previously).

Normally, the flange focal distance is strictly defined by the lens mount standard. High accuracy is required for the flange focal distance, and the lens 101 cannot exhibit a predetermined performance unless the flange focal distance is accurate. Furthermore, when a tilt occurs, the lens 101 cannot exhibit a predetermined performance, for example, a focusing position on the imaging surface of the image sensor 102 becomes non-uniform.

The detection system 1 according to the present embodiment has a configuration in which the imaging device 100 itself detects the amount of tilt and the amount of deviation in the flange focal distance. As processing prior to detection, a measurement chart 2 is placed in front of the lens 101. The measurement chart 2 here is constituted by, for example, paper on which a graphic pattern with a high spatial frequency is formed (described later). The measurement chart 2 is placed parallel to the imaging surface of the image sensor 102 of the imaging device 100 (or perpendicular to the optical axis of the lens 101).

The image sensor 102 has an imaging region having an image size of 6K, or an image size larger than 4K. In the description below, for convenience of description, it is assumed that the image sensor 102 outputs a 6K-size captured image.

To detect the amount of tilt and the amount of deviation in the flange focal distance of the lens 101, the front-end camera signal processing unit 103 moves a cutout position, and cuts out, from one 6K-size captured image, captured images of small areas of 4K image size at a plurality of places. Then, the camera signal processing unit 103 performs AF demodulation for each area of 4K image size cut out by the front-end camera signal processing unit 103, and obtains data regarding a relationship of a focusing degree to a focus position. When performing AF demodulation, the camera signal processing unit 103 increases an accuracy of measurement by setting a plurality of AF demodulation frames in a 4K cutout image.

Figure 3:
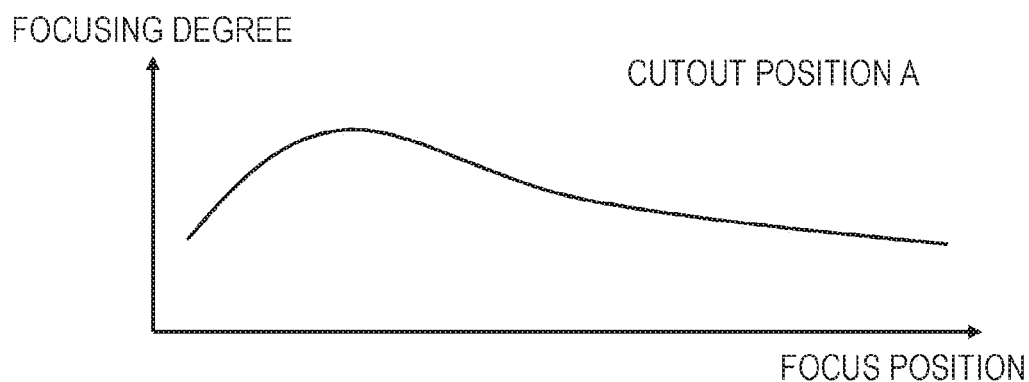
FIG. 3 is a diagram exemplifying a relationship of a focusing degree to a focus position for each cutout position.
Figure 3:
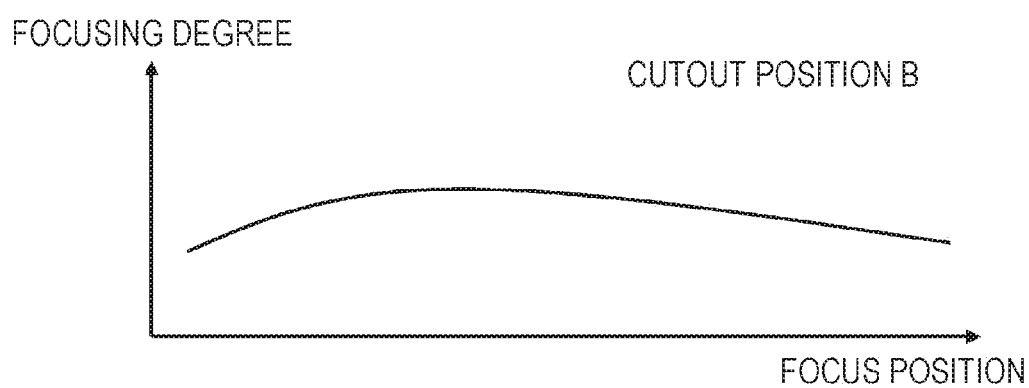
Figure 3:
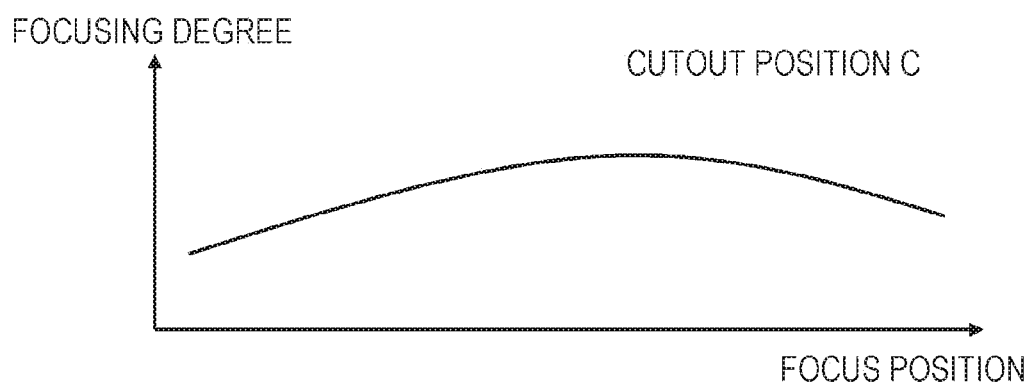
Figure 3:
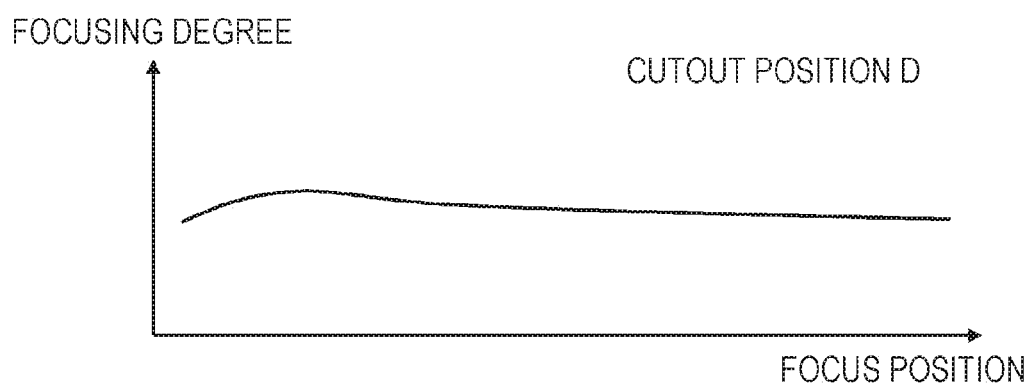

In the description below, for convenience of description, it is assumed that the cutout position is moved from four corners of the 6K-size captured image in a sequential order such as A, B, C, and D to cut out small areas of 4K image size. A user manually operates the focus for each of the areas A, B, C, and D, and the video signal processing unit 104 performs AF demodulation. Thus, data regarding the relationship of the focusing degree to the focus position for each area as illustrated in FIG. 3 can be obtained. For example, it is possible to manually operate the focus by rotating the focus ring 114 on the outer circumference of the interchangeable lens 101. Then, it is possible to quantitatively calculate an amount of two-dimensional tilt of the image sensor 102 with respect to the optical axis of the lens 101 by quantifying a correlation of the focus position where the focusing degree reaches a peak between the corresponding areas A, B, C, and D. Furthermore, in a case where the calculated amount of tilt is within an allowable range, the amount of deviation in the flange focal distance of the lens 101 can be further calculated.

Specifically, with a focus position corresponding to the length of the flange focal distance defined by the lens mount standard set as a reference position, a conversion using a predetermined relational expression 1 is performed on a distance between the focus position where the focusing degree reaches a peak in each of the areas A, B, C, and D and the reference position described above, and an amount obtained by the conversion corresponds to the amount of deviation in the flange focal distance. Here, the predetermined relational expression 1 is, for example, a function for converting an amount of change in the focus position (distance) into an amount of change in the flange focal distance (amount of deviation). Furthermore, a conversion using a predetermined relational expression 2 is performed on a relative distance between the focus positions where the focusing degree reaches a peak in the corresponding areas A, B, C, and D, and an amount obtained by the conversion corresponds to a relative amount of tilt. Here, the predetermined relational expression 2 is, for example, a function for converting an amount of change in the focus position (distance) into a relative amount of tilt (amount of deviation between two different areas). Note that the relational expressions 1 and 2 may be functions different from each other, or the same function may be used. Note that the amount of tilt can also be calculated as an absolute amount using, for example, one of the areas as a reference, on the basis of the relative amount of tilt calculated above. Furthermore, in the above description, in a case where the calculated amount of tilt is within the allowable range, the amount of deviation in the flange focal distance of the lens 101 is further calculated. It is also possible to calculate each of the amount of tilt and the amount of deviation in the flange focal distance, or calculate the amount of tilt and the amount of deviation in the flange focal distance as one amount including both of them. In the case of calculating them as one amount, the amount may be calculated as, for example, an absolute amount with respect to the reference position described above on the basis of the relative amount of tilt and the amount of deviation in the flange focal distance.

Note that, in the example described here, in order to grasp a state of the tilt of the image sensor 102 in a horizontal direction and in a perpendicular direction, at least four areas, that is, two areas in the horizontal direction by two areas in the perpendicular direction, are cut out as the small areas. For example, in a case where it is only required to grasp the state of the tilt in the image sensor 102 in the horizontal direction, it is only required to set at least two areas in the horizontal direction. In a case where it is only required to grasp the state of the tilt in the perpendicular direction, it is only required to set at least two areas in the perpendicular direction.

Figure 4:
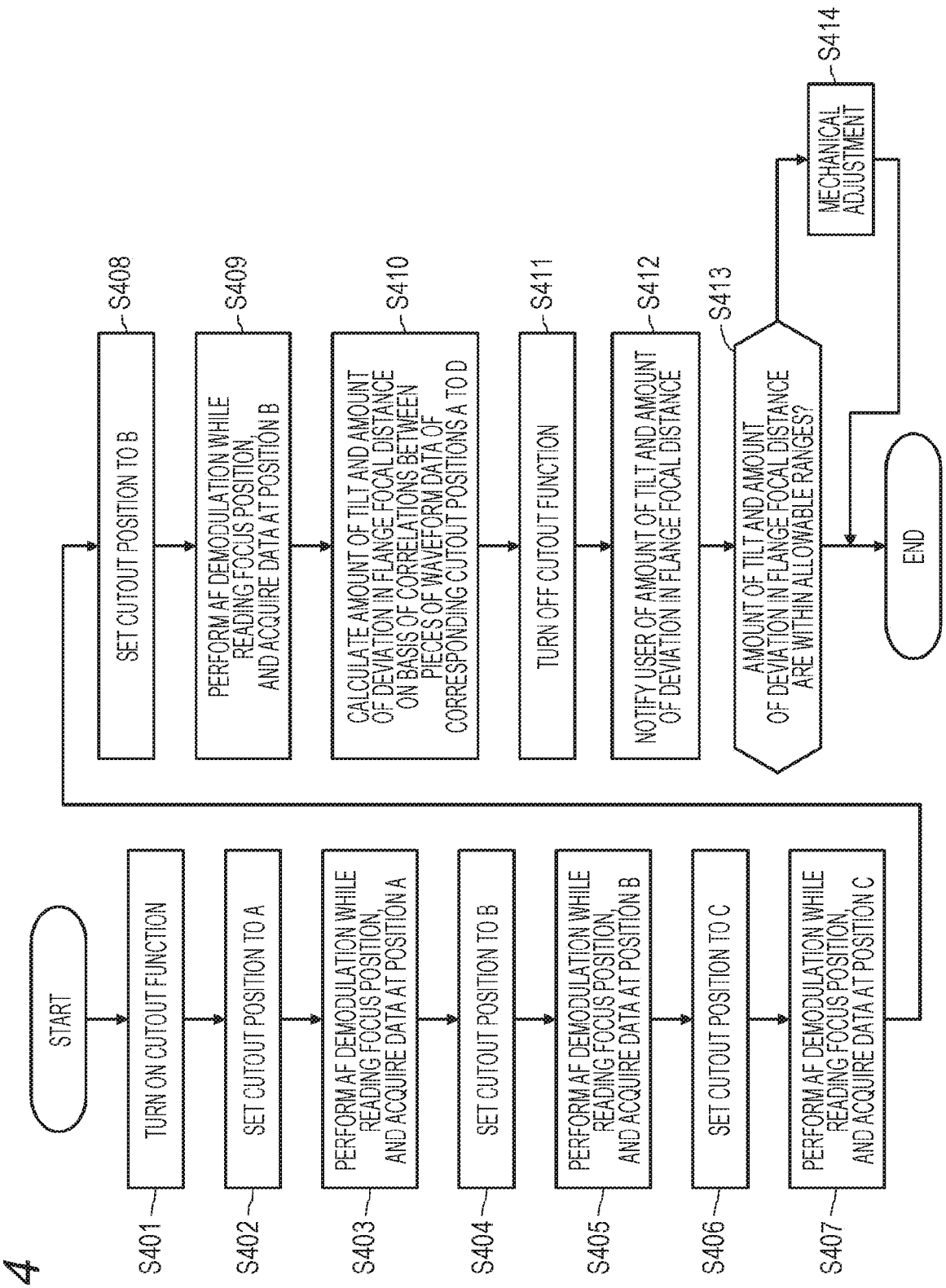
FIG. 4 is a flowchart illustrating a processing procedure for detecting an amount of tilt and an amount of deviation in a flange focal distance of the imaging device 100 in the detection system 1.

B. Processing Flow for Detecting Amount of Tilt and Amount of Deviation in Flange Focal Distance FIG. 4 illustrates, in the form of a flowchart, a processing procedure for detecting the amount of tilt and the amount of deviation in the flange focal distance of the imaging device 100 in the detection system 1. This processing procedure is started, after the measurement chart 2 has been placed in front of the lens 101 as a preliminary preparation, in response to an instruction of a user to the imaging device 100 to perform the detection processing.

First, the imaging device 100 turns on a cutout function of the front-end camera signal processing unit 103 for sequentially cutting out 4K image size images from a 6K image size image captured by the image sensor 102 (step S401). For example, the user can turn on the cutout function by selecting a menu screen displayed on the display unit 113 (described previously) on the back surface of the main body of the imaging device 100, or by operating a mechanical switch included in the imaging device 100.

The front-end camera signal processing unit 103 first sets a cutout position for cutting out an area of 4K image size from the 6K image captured by the image sensor 102 to the position A (described previously, and see FIG. 1) (step S402). Then, the user rotates the focus ring 114 to manually operate the focus for the cutout position A. While the user is manually operating the focus, the video signal processing unit 104 continuously performs AF demodulation while reading the focus position of the lens 101 (step S403), and successively records a focusing degree for each focus position. In this way, waveform data (for example, see FIG. 3) representing the relationship of the focusing degree to the focus position for the cutout position A is obtained.

In step S403, for example, the user moves the focus position from one end to the other by rotating the focus ring 114 on the outer circumference of the interchangeable lens 101 (the user performs a similar operation to manually operate the focus for each of the following cutout positions). Furthermore, an AF demodulation frame corresponding to the cutout position A is displayed on the display unit 113 or the like so that the user can be notified of the position of AF demodulation. Then, the user finishes moving the focus position, and then confirms the waveform data acquired from the area of the cutout position A by, for example, operating the user interface of the display unit 113.

The front-end camera signal processing unit 103 subsequently moves the cutout position for cutting out a small area of 4K image size from the 6K captured image to the position B (described previously, and see FIG. 1) (step S404). The user rotates the focus ring 114 to manually operate the focus for the cutout position B. While the user is manually operating the focus, the video signal processing unit 104 continuously performs AF demodulation while reading the focus position of the lens 101 (step S405), and successively records a focusing degree for each focus position. In this way, waveform data (for example, see FIG. 3) representing the relationship of the focusing degree to the focus position for the cutout position B is obtained. Then, the user finishes moving the focus position, and then confirms the waveform data acquired from the area of the cutout position B by, for example, operating the user interface of the display unit 113.

The front-end camera signal processing unit 103 further subsequently moves the cutout position for cutting out a small area of 4K image size from the 6K captured image to the position C (described previously, and see FIG. 1) (step S406). The user rotates the focus ring 114 to manually operate the focus for the cutout position C. While the user is manually operating the focus, the video signal processing unit 104 continuously performs AF demodulation while reading the focus position of the lens 101 (step S407), and successively records a focusing degree for each focus position. In this way, waveform data (for example, see FIG. 3) representing the relationship of the focusing degree to the focus position for the cutout position C is obtained. Then, the user finishes moving the focus position, and then confirms the waveform data acquired from the area of the cutout position C by, for example, operating the user interface of the display unit 113.

The front-end camera signal processing unit 103 further subsequently moves the cutout position for cutting out a small area of 4K image size from the 6K captured image to the position D (described previously, and see FIG. 1) (step S408). The user rotates the focus ring 114 to manually operate the focus for the cutout position D. While the user is manually operating the focus, the video signal processing unit 104 continuously performs AF demodulation while reading the focus position of the lens 101 (step S409), and successively records a focusing degree for each focus position. In this way, waveform data (for example, see FIG. 3) representing the relationship of the focusing degree to the focus position for the cutout position D is obtained. Then, the user finishes moving the focus position, and then confirms the waveform data acquired from the area of the cutout position D by, for example, operating the user interface of the display unit 113.

The camera signal processing unit 103 compares pieces of waveform data representing the relationship of the focusing degree to the focus position acquired from the 4K image size small areas cut out at the corresponding cutout positions A, B, C, and D. Then, correlations between focus positions where the focusing degree reaches a peak in the small areas of 4K image size cut out at the corresponding cutout positions A, B, C, and D are quantified, and the amount of two-dimensional tilt of the image sensor 102 with respect to the optical axis of the lens 101 and the amount of deviation in the flange focal distance are calculated (step S410).

Thereafter, the imaging device 100 turns off the cutout function of the front-end camera signal processing unit 103 (step S411).

Then, the imaging device 100 notifies the user of the amount of tilt of the image sensor 102 and the amount of deviation in the flange focal distance calculated in step S410 (step S412). For example, the amount of tilt and the amount of deviation in the flange focal distance may be displayed on the display unit 113 on the back surface of the main body of the imaging device 100. Alternatively, the amount of tilt and the amount of deviation in the flange focal distance may be displayed on a monitor display externally connected to the imaging device 100 via an HDMI (registered trademark) interface or the like.

Next, it is checked whether or not the amount of tilt of the image sensor 102 and the amount of deviation in the flange focal distance calculated in step S410 are within allowable ranges (step S413). Whether or not the amounts are within the allowable ranges may be determined by the user oneself who has been notified of calculation results. Then, if either of the allowable ranges is exceeded (No in step S413), the tilt or the flange focal distance is mechanically adjusted (step S414).

The mechanical adjustment in step S414 is performed by the user oneself. The imaging device 100 prompts the user to perform the mechanical adjustment by displaying image information regarding the mechanical adjustment on the display unit on the back surface of the main body or issuing a voice message or a warning sound. At that time, quantitative information regarding the amount of tilt of the image sensor 102 and the amount of deviation in the flange focal distance is presented so that the user can complete the mechanical adjustment at a time.

C. Mechanism for Following User's Focus Operation

Figure 5:
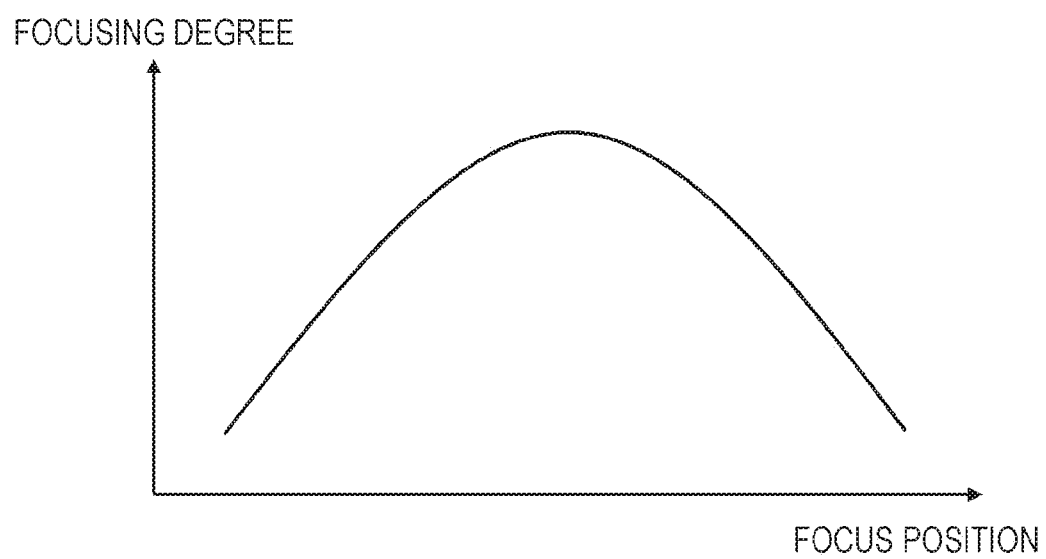
FIG. 5 is a diagram exemplifying waveform data of a relationship of the focusing degree to the focus position.

In each of the processing steps S403, S405, S407, and S409 in the processing flow illustrated in FIG. 3, it is preferable to obtain waveform data such as the one illustrated in FIG. 5 for each 4K image size area, in which the focusing degree gradually changes in accordance with a shift of the focus position and the focus position where the focusing degree reaches the peak can be accurately determined. For this purpose, it is necessary to acquire the focus position of the lens 101 with high accuracy and record the focusing degree obtained by AF demodulation in association with the focus position.

Figure 6:
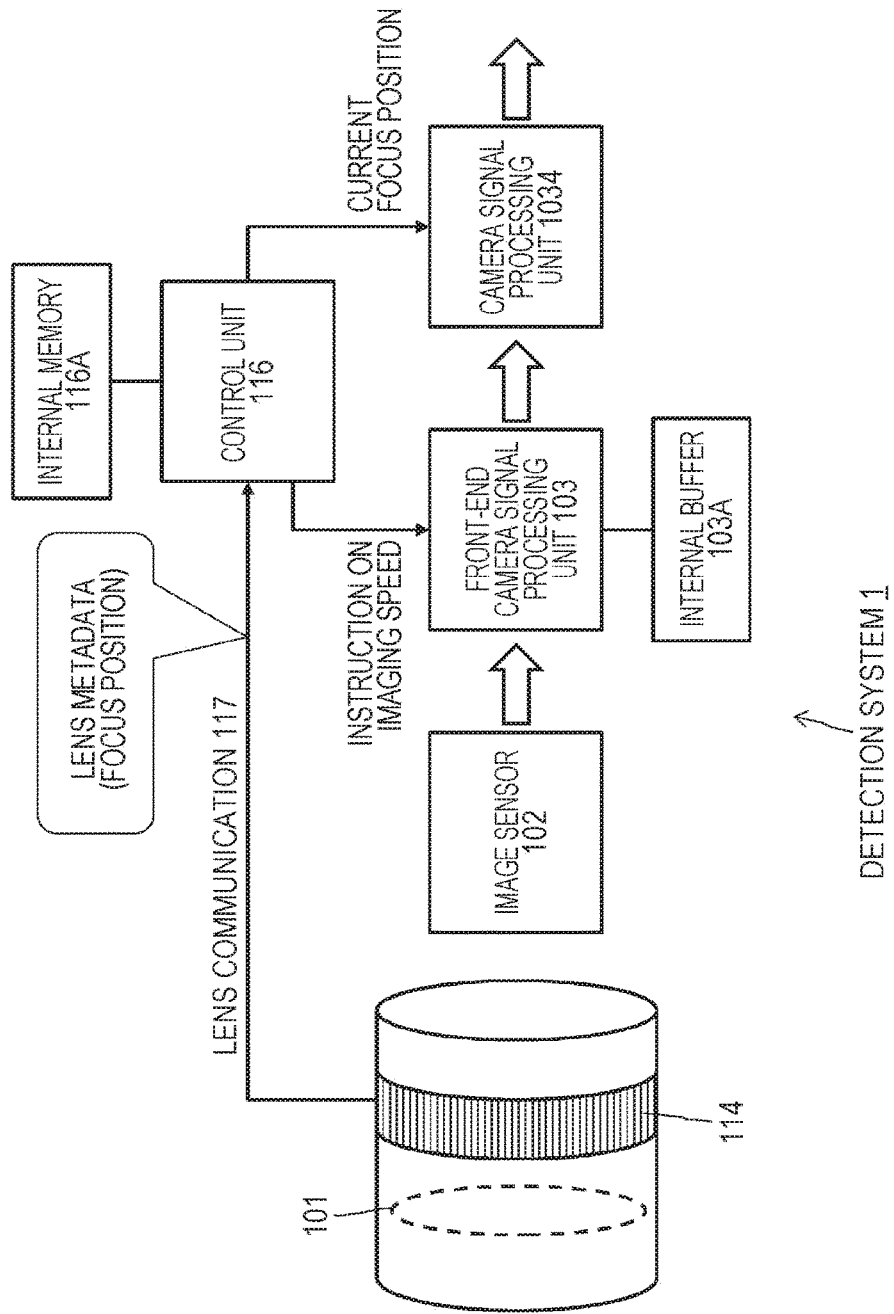
FIG. 6 is a diagram for illustrating a mechanism for associating the focus position of a lens 101 with the focusing degree in the detection system 1.

FIG. 6 illustrates a mechanism for associating the focus position of the lens 101 with the focusing degree in the detection system 1. From the lens 101 side, lens metadata information including information regarding the focus position is transmitted via a lens communication 117. This allows a control unit 116 in the imaging device 100 to read, via the lens communication 117, the focus position when a user has manually rotated the focus ring 114. The video signal processing unit 104 can receive information regarding the current focus position of the lens 101 from the control unit 116, and outputs the information in association with the focusing degree obtained by AF demodulation.

Here, in a case where a user moves the focus position by a manual operation such as rotating the focus ring 114 of the lens 101, there is a problem in that the speed of moving the focus position is not constant.

Figure 7:
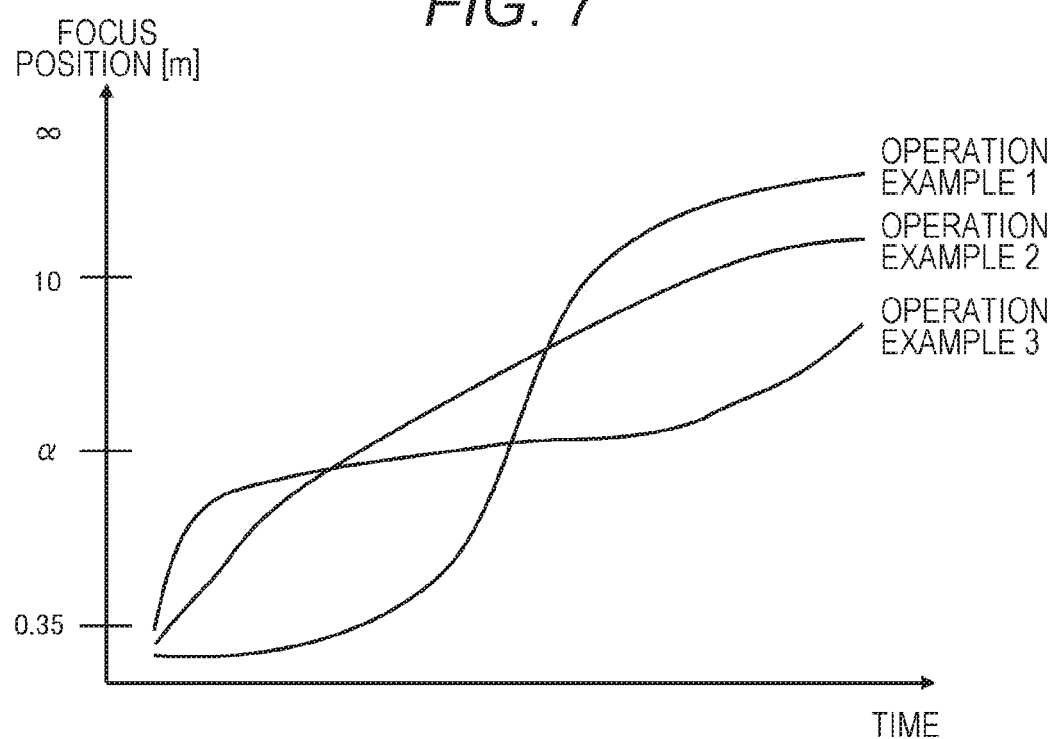
FIG. 7 is a diagram illustrating Operation Examples 1 to 3 of manually operating the focus position of the lens 101.

FIG. 7 illustrates Operation Examples 1 to 3 of manual operation of the focus position of the lens 101 by a user. In this figure, a horizontal axis indicates time, and a vertical axis indicates the focus position. The moving speed of the focus position is not constant, but changes in accordance with the time and the focus position. For example, among the curves indicating Operation Example 1, a steep gradient indicates that the moving speed of the focus position is rapid.

In a case where the moving speed of the focus position is not constant but the imaging speed of the image sensor 102 (or an image update cycle) is kept constant, the focusing degree cannot be calculated in time and changes in the focusing degree may be missed at portions where the moving speed of the focus position is rapid, and this makes it impossible to acquire ideal waveform data as illustrated in FIG. 5.

For this reason, in consideration of the fact that the focus operation is quickly performed on the lens 101 side, it is necessary to increase the image update cycle in advance on the imaging device 100 main body side. Furthermore, the image sensor 102 is switched to high-speed imaging while the amount of tilt and the amount of deviation in the flange focal distance are being calculated or when the speed of focus operation is rapid. For example, when the control unit 116 detects that the focus operation speed has become rapid on the basis of information regarding the focus position received every moment by the lens communication 117, the control unit 116 instructs the front-end camera signal processing unit 103 to switch the image sensor 102 to high-speed imaging.

Figure 8:
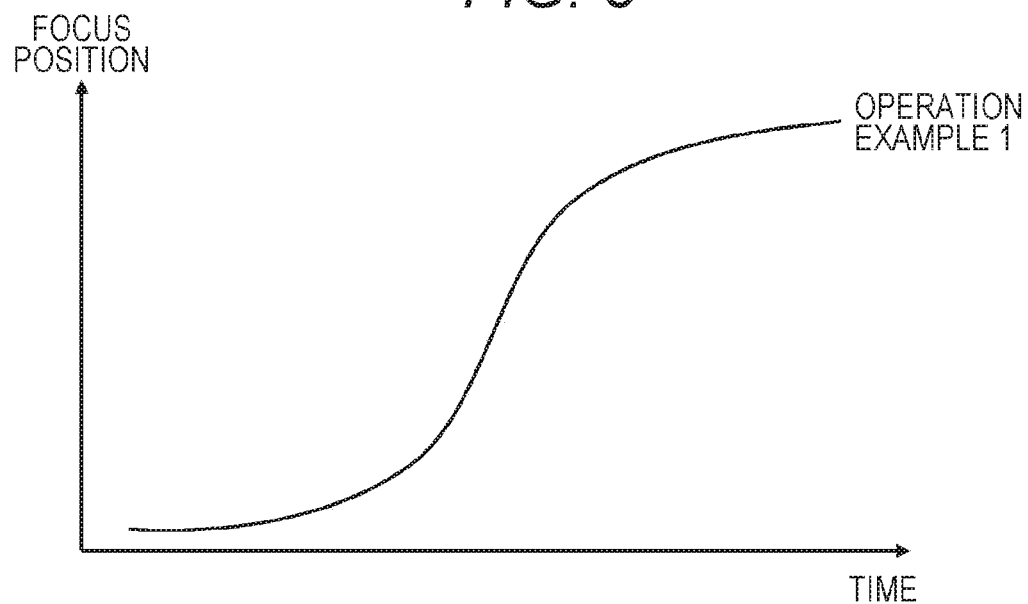
FIG. 8 is a diagram illustrating a state in which an imaging speed is adaptively changed in response to Operation Example 1.

FIG. 8 illustrates the imaging speed (or the image update cycle) being adaptively changed in response to Operation Example 1 of manually operating the focus position illustrated in FIG. 7. The length of each square in a lower part of this figure represents the image update cycle. As illustrated in the figure, the image update cycle is shortened in a time region where the gradient of the curved line indicating Operation Example 1 is steep.

Furthermore, it is ideal that an operation cycle of AF demodulation in the video signal processing unit 104 can be shortened in accordance with the high-speed image update cycle of the image sensor 102, but it is assumed that the operation cycle of AF demodulation may not be able to be shortened beyond a certain limit due to hardware restrictions or the like.

For this reason, the front-end camera signal processing unit 103 may cause a processed video to be temporarily stored in an internal buffer 103A for a plurality of frame periods. Thereafter, the video stored in the internal buffer 103A is sent to the video signal processing unit 104 in time with the operation cycle of AF demodulation and subjected to AF demodulation. This allows the focusing degree to be calculated with nothing missed out while the focus position of the lens 101 is moved from one end to the other.

On the other hand, the lens metadata received via the lens communication 117 includes information regarding the focus position of the lens 101, and the information can be read by the control unit 116 (described previously). The control unit 116 stores the information regarding the focus position of the lens 101 in an internal memory 116A. A cycle of acquiring information regarding the focus position of the lens 101 by the lens communication 117 is different from a cycle of capturing a video, but acquisition of the focus position and capturing of a video are both performed under control of the control unit 116, so that the focus position can be associated with a video frame in the internal buffer 103A. In this way, it is possible to obtain the relationship of the focusing degree to the focus position in the small area at each cutout position.

D. Visual Display of Amount of Tilt and Amount of Deviation in Flange Focal Distance As described in the above section A, in order to detect the amount of tilt and the amount of deviation in the flange focal distance of the imaging device 100, the measurement chart 2 with a graphic pattern with a high spatial frequency formed on its surface is used.

Figure 9:
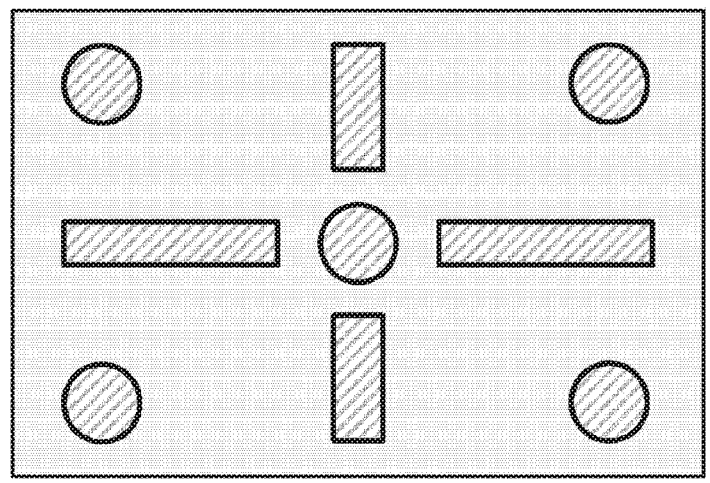
FIG. 9 is a diagram illustrating an example of a measurement chart.

FIG. 9 illustrates an example of the measurement chart 2. The measurement chart 2 preferably has an aspect ratio that is the same with or close to that of the imaging region of the image sensor 102. The graphic pattern formed on the surface of the measurement chart 2 is not limited to the illustrated example. However, it is preferable that the graphic pattern be symmetrical so that characteristics do not differ from cutout position to cutout position in 4K image size small areas.

In step S410 of the flowchart illustrated in FIG. 4, correlations between focus positions where the focusing degree reaches a peak in the small areas of 4K image size cut out at the corresponding cutout positions A, B, C, and D in the imaging region of the image sensor 102 are quantified, and the amount of two-dimensional tilt of the image sensor 102 with respect to the optical axis of the lens 101 and the amount of deviation in the flange focal distance are calculated. Then, in step S412, the user is notified of the amount of tilt of the image sensor 102 and the amount of deviation in the flange focal distance. For example, the amount of tilt and the amount of deviation in the flange focal distance are displayed on the display unit 113 on the back surface of the main body of the imaging device 100 or on a monitor screen (not illustrated) externally connected to the imaging device 100. Note that the amount of two-dimensional tilt of the image sensor 102 and the amount of deviation in the flange focal distance are calculated, for example, on the basis of an assumption that the image sensor 102 is a rigid body (free of deformation due to distortion or the like).

Figure 10:
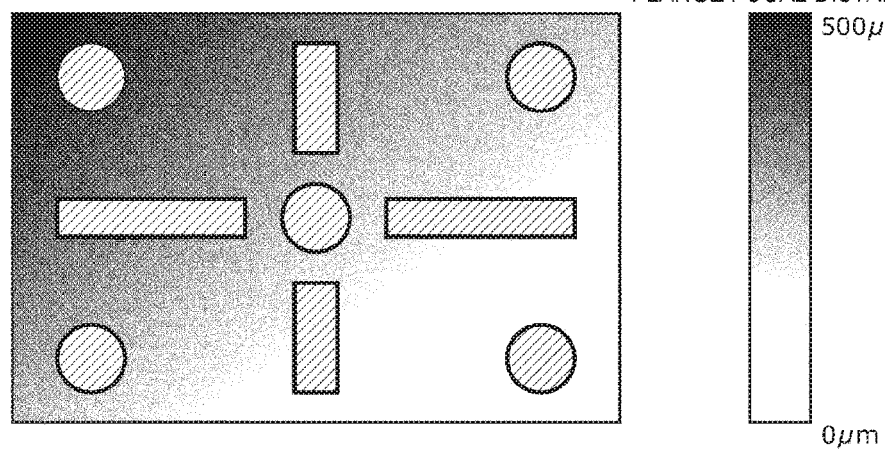
FIG. 10 is a diagram illustrating a configuration example of a screen that displays the amount of tilt and the amount of deviation in the flange focal distance of the lens 101.

FIG. 10 illustrates a configuration example of a screen that displays the amount of tilt and the amount of deviation in the flange focal distance of the lens 101 that are used for notification to the user in step S412. In the illustrated example, the amount of tilt is represented by color density or color shade, and is superimposed and displayed on a video imaging the measurement chart 2 (see FIG. 9). A display screen as illustrated in FIG. 10 makes it easier for the user to grasp quantitatively and visually the angle in 360 degrees centered on the optical axis of the lens 101 at which the image sensor 102 has a tilt, that is, two-dimensional distribution of the amount of tilt.

Note that, in a case where there is no tilt and only a deviation in the flange focal distance has occurred, the entire screen is displayed in a uniform density or in a uniform color.

Furthermore, in a case where the amount of tilt or the amount of deviation in the flange focal distance calculated in step S410 is out of the allowable range, the amount of deviation may be displayed as a numerical value in addition to color density or color shade. This makes it easier for the user to perform the mechanical adjustment of the tilt or the flange focal distance in step S414. For example, it is possible to correct the tilt or the deviation in the flange focal distance by replacing a shim inserted between the lens 101 and the portion where the lens is attached in the main body of the imaging device 100. Knowing the numerical value of the amount of deviation makes it easier for the user to replace the shim. Furthermore, display of the amount of tilt or the amount of deviation in the flange focal distance is not limited to display of a numerical value, but can be any display that indicates the state of the tilt or the deviation in the flange focal distance. For example, the amount may be divided into predetermined levels (ranges of numerical values), and these levels (for example, large, medium, small, and the like) may be used for display of the amount.

E. Display of Focus Operation Target

During operation of the focus of the imaging device 100, a focus target position is displayed on the display unit 113 of the imaging device 100 or an externally connected monitor screen.

Figure 11:
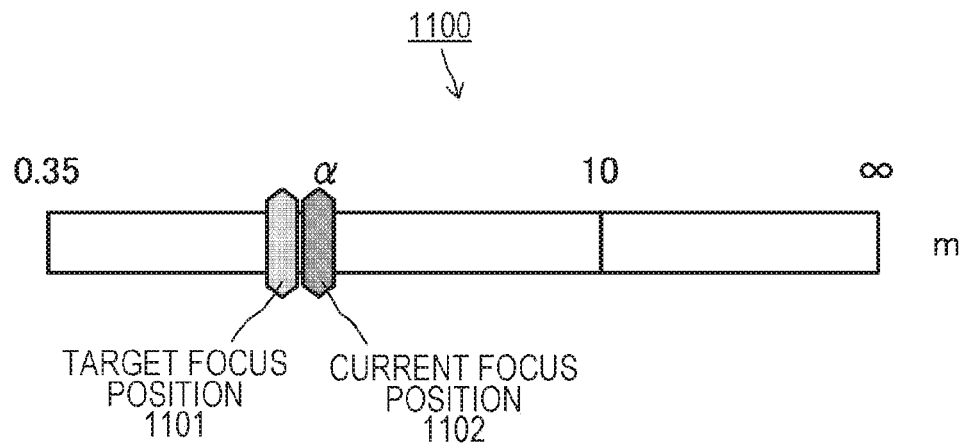
FIG. 11 is a diagram illustrating an example of display of a focus target position.

FIG. 11 illustrates an example of display of the focus target position. In the illustrated example, the horizontal axis direction indicates a distance in the direction of the optical axis of the imaging device 100 (or the lens 101), and the focus target position is displayed in the form of an indicator 1100 that displays both a target focus position 1101 and a current focus position 1102.

Figure 12:
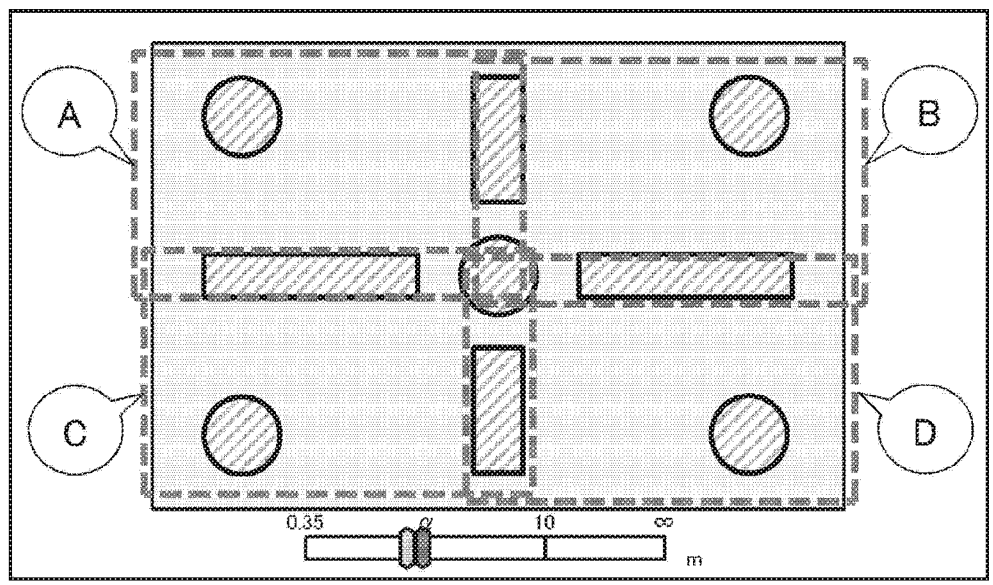
FIG. 12 is a diagram illustrating a configuration example of a monitor screen on which the focus target position is displayed.

FIG. 12 illustrates an example in which the indicator displaying the target position of the focus illustrated in FIG. 11 is displayed on the display unit 113 or an externally connected monitor screen during operation of the focus. As illustrated in this figure, the indicator is preferably arranged, for example, near the bottom edge of the screen so that the indicator may not overlap an image of the measurement chart 2. A user can operate the focus while viewing a video of the measurement chart 2 and display of the indicator at the same time.

Figure 13:
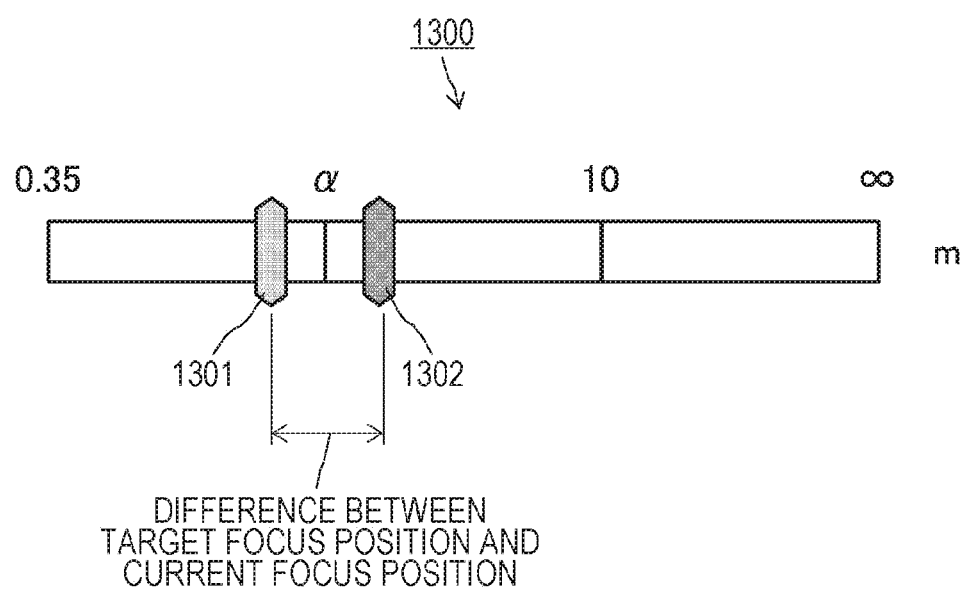
FIG. 13 is a diagram illustrating an example of displaying the focus target position (in a case where a current focus position is largely deviated from a target focus position).

Furthermore, FIG. 13 illustrates an example of display of an indicator 1300 in a case where the current focus position is largely deviated from the target focus position. In the example illustrated in FIG. 13, a current focus position 1302 is largely deviated from a target focus position 1301. In a case where a difference between the target focus position 1301 and the current focus position 1302 is too large, there is a possibility that the accuracy of calculation of the amount of tilt and the amount of deviation in the flange focal distance is reduced. Thus, as illustrated in FIG. 12 and the like, the target position of the focus is presented to a user so that the user is led to operate the focus in accordance with the target position.

As illustrated in FIG. 8, even in a case where the image sensor 102 has been switched to high-speed imaging, when a user is operating the focus very fast, there is a possibility that high-speed imaging fails to keep up with the user's operation, and highly accurate focusing degree data may not be obtained, or focusing degree data may be missed. Thus, as illustrated in FIG. 12, the target position for focus operation is displayed so that the user can operate the focus operation while viewing the target position.

Figure 14:
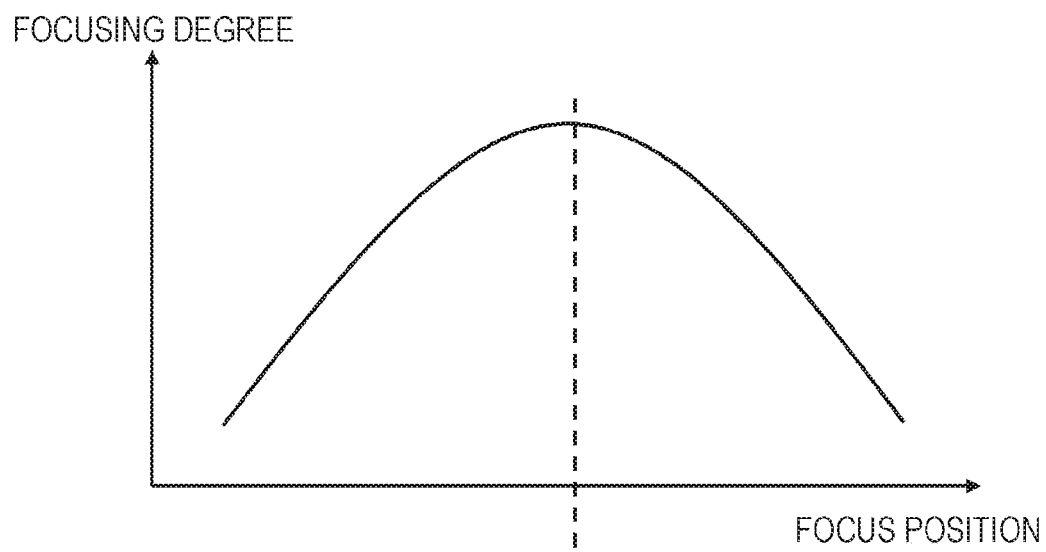
FIG. 14 is a diagram illustrating an example of movement of the focus position.
Figure 14:
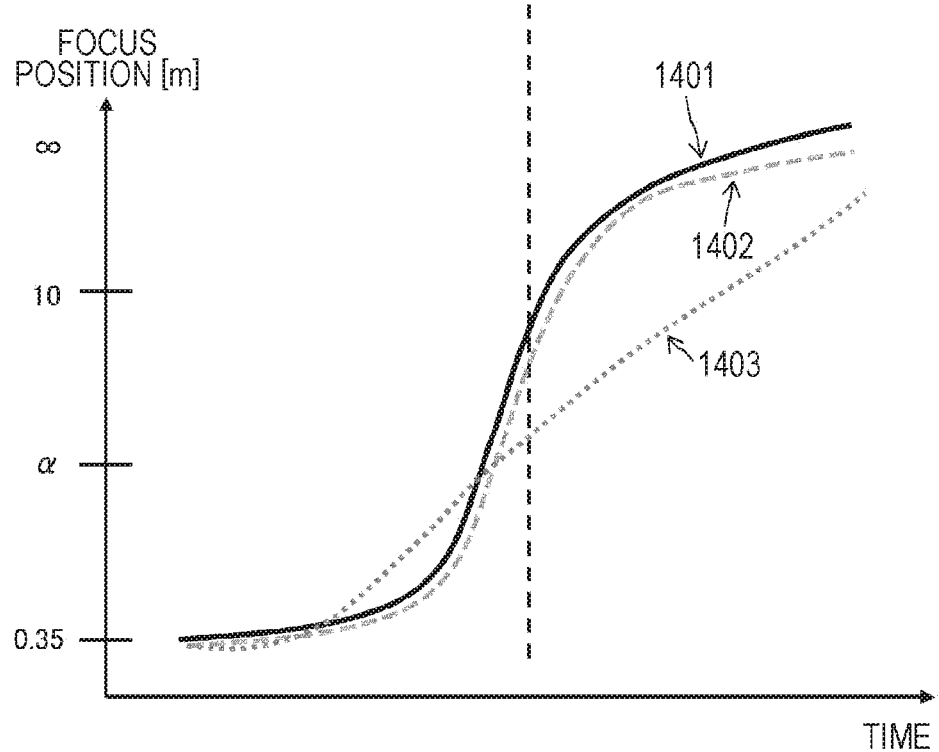

FIG. 14 illustrates an example of movement of the focus position together with the relationship of the focusing degree to the focus position. This figure illustrates movement of the focus position, in which a reference numeral 1401 indicates a focus operation reference, and reference numerals 1402 and 1403 indicate two examples, each showing focus operation by a user. One user operation example 1402 indicates movement of the focus position that is close to the focus operation reference 1401, and focusing degree data can be acquired with high accuracy. The other user operation example 1403 indicates movement of the focus position that is largely deviated from the focus operation reference 1401, and focusing degree data acquired has a lower accuracy.

F. Summary

The imaging device 100 according to the present embodiment is connected with the interchangeable lens 101 that enables manual operation of the focus position, and has a function of automatically calculating with high accuracy the amount of tilt of the image sensor 102 and the amount of deviation in the flange focal distance of the lens 101 while following a focus operation performed by a user, and a function of presenting results of the calculation to the user in an easy-to-understand manner. Features of the imaging device 100 will be given.

(1) The imaging device 100 is connected with the lens 101 that enables manual operation of the focus position, and includes the image sensor 102, the front-end camera signal processing unit 103, and the video signal processing unit 104. The image sensor 102 has an image size of 6K (or larger than 4K). The front-end camera signal processing unit 103 partially cuts out small areas of 4K image size on which AF demodulation can be performed by the AF demodulation circuit in the video signal processing unit 104 in a subsequent stage from a plurality of cutout positions A, B, C, and D in an image captured by the image sensor 102. Then, the video signal processing unit 104 uses the AF demodulation circuit inside thereof to acquire the focusing degree for each of the cut out small areas.

(2) In a case where the image sensor 102 has a tilt, the value of the focus position at which the focusing degree becomes highest differs from area to area that has been partially cut out of the image sensor 102. For this reason, it is possible to quantitatively obtain a deviation in the peak position of the focusing degree for each cutout area by obtaining cross-correlations between the focusing degrees of the partial cutout areas. Then, it is possible to calculate the direction and amount of tilt of the image sensor 102 and the amount of deviation in the flange focal distance of the lens 101 by quantifying correlations between the peak positions of the focusing degrees of the corresponding cutout areas.

(3) In a case where the lens 101 enables manual operation of the focus position, a target focus position serving as a reference when a user operates the focus and the current focus position, which is a result of the focus operation by the user, are displayed so that the amount of tilt and the amount of deviation in the flange focal distance can be calculated with high accuracy, with the user performing manual operation of freely changing the focus position. As illustrated in FIG. 12, the target position and the current position may be superimposed and displayed on a captured image of a measurement chart.

(4) The image sensor 102 is switched to high-speed imaging so that the focusing degree for each focus position can be measured with nothing missed out, following the focus operation by the user. Furthermore, in order to absorb a difference between the image update cycle of the image sensor 102 and the operation cycle of AF demodulation, an image captured by the image sensor 102 is temporarily stored in the internal buffer 103A of the front-end camera signal processing unit 103 so that AF demodulation can be performed in time with an operation cycle of the AF demodulation circuit in the video signal processing unit 104. Furthermore, the control unit 116 temporarily stores, in the internal memory 116A, information regarding the focus position acquired via the lens communication 117, and then the information is associated with data regarding the focusing degree obtained by the AF demodulation circuit in the video signal processing unit 104.

(5) In order to allow a user to visually understand the amount of tilt of the image sensor 102 and the amount of deviation in the flange focal distance of the lens 101, the imaging device 100 causes an image in which the amount of tilt is represented by color density or color shade to be superimposed on a captured image of a measurement chart and displayed on the display unit 113 on the back surface of the main body of the imaging device 100 or on an externally connected monitor screen (see FIG. 10). In a case where the calculated amount of tilt and amount of deviation in the flange focal distance are within allowable ranges, only visual display as illustrated in FIG. 10 is presented. Furthermore, in a case where the calculated amount of tilt or amount of deviation in the flange focal distance is out of the allowable range, quantitative information indicating numerical values of the amount of tilt and the amount of deviation in the flange focal distance, and the like is displayed in addition to visual display as illustrated in FIG. 10. When a user knows the numerical value of the amount of deviation, it becomes easier for the user to perform a mechanical adjustment such as replacement of the shim.

G. Effects

In a case of a high-priced video camera used for production and broadcasting of movies and dramas, interchangeable lenses with different lens specifications are frequently used, and lenses are frequently replaced depending on shooting scenes. Depending on shooting scenes, such a video camera may be used in a severe environment such as a high-temperature, low-temperature, or dust-laden environment, or may be used in an environment where the video camera or lens is subjected to frequent shocks. For this reason, mechanical attachment that has been adjusted at the time of product shipment of a camera becomes less accurate due to deterioration over time, and there are cases where an allowable value is exceeded. Furthermore, high-priced video cameras in recent years have image sensors of larger sizes, and an amount of deviation in the tilt of such an image sensor has become more noticeable than in the past.

With such a background, there have been more and more cases in which users of high-priced video cameras (mainly camera technicians at rental houses in cases of movies, or camera technicians at broadcast stations in cases of broadcasting) attach a lens to be used and then check that the amount of tilt of the image sensor is within the allowable range and that there is no amount of deviation in the flange focal distance of the lens.

Conventionally, an experienced user has taken time to image a measurement chart, visually check the amount of deviation on a monitor, and make an adjustment by, for example, inserting a shim (spacer) between a lens and a lens mount portion to reduce the amount of deviation. This operation is based on a visual check, not on a quantitative amount of deviation, so an experienced and technically-skilled user has taken time to make the adjustment.

On the other hand, according to the technology disclosed in the present specification, a user views a video indicating a two-dimensional distribution of the amount of tilt as illustrated in FIG. 10, which notifies the user of whether or not the amount of tilt and the amount of deviation in the flange focal distance are within the allowable ranges, and notifies the user of the amount of deviation quantitatively and in an easy-to-understand manner in a case where the amount of deviation is out of the allowable range. Furthermore, even in a case where a deviation has occurred, a user only has to make an adjustment once to correct the amount of tilt and the amount of deviation in the flange focal distance, and the efficiency of the adjustment can be improved.

The amount of tilt is generally adjusted using an expensive measuring jig in a camera manufacturing process. On the other hand, according to the technology disclosed in the present specification, the main body of the camera has a function of measuring data regarding the focusing degree with respect to the focus position for each of small areas cut out at a plurality of cutout positions in an imaging region of the image sensor, and calculating and maintaining a two-dimensional distribution of the amount of tilt. This allows even a user who does not have sufficient knowledge about adjustments to easily make an adjustment after shipment of the product.

Mainly due to the following three mechanisms, even a user who does not have sufficient knowledge about adjustments can make an adjustment.

(1) A mechanism for displaying a target position (see FIG. 12) when a user is manually operating the focus of the lens so that the user can perform the operation in accordance with the target position and acquire a highly accurate focusing degree.

(2) A mechanism for enabling shortening of an AF demodulation cycle even in a case where the speed of manual operation is not constant (see FIG. 8).

(3) A mechanism for displaying, quantitatively and in an easy-to-understand manner, whether the amount of tilt and the amount of deviation in the flange focal distance calculated by the main body of the camera are within allowable ranges, and the values of the amounts (see FIG. 10).

INDUSTRIAL APPLICABILITY

The technology disclosed in the present specification has been described in detail with reference to the specific embodiment. However, it is obvious that those skilled in the art may make modifications and substitutions to the embodiment without departing from the gist of the technology disclosed in the present specification.

The technology disclosed in the present specification can be applied to digital cameras for business and for general users mainly using interchangeable lenses. According to the technology disclosed in the present specification, when a tilt or a deviation in a flange focal distance caused by deterioration over time occurs in a digital camera shipped after the amount of tilt and the flange focal distance have been properly adjusted, or when a lens has been replaced, a detection processing procedure as illustrated in FIG. 4 is performed to allow a user to check the amount of tilt and the amount of deviation in the flange focal distance and perform a mechanical adjustment.

In short, the technology disclosed in the present specification has been described by way of example, and the description in the present specification should not be interpreted restrictively. In order to determine the gist of the technology disclosed in the present specification, the claims should be taken into consideration.

Note that the technology disclosed in the present specification may have the following configurations.

(1) An imaging device including:

a measurement unit that acquires data regarding a focus position and a focusing degree of a lens for every one of a plurality of small areas in an imaging region of an image sensor; and an arithmetic unit that calculates an amount of tilt of the image sensor or an amount of deviation in a flange focal distance of the lens on the basis of a correlation of the data regarding the focus position and the focusing degree between the plurality of small areas.

(2) The imaging device according to (1), in which the measurement unit measures focusing degree data for each focus position by performing AF demodulation following movement of the focus position manually operated by a user.

(3) The imaging device according to (1) or (2), in which the measurement unit acquires the data using a captured image obtained by high-speed imaging of the image sensor.

(4) The imaging device according to any one of (1) to (3), further including a buffer that temporarily stores an image captured by the image sensor, in which the measurement unit performs AF demodulation using a captured image retrieved from the buffer in time with an operation cycle of AF demodulation.

(5) The imaging device according to any one of (1) to (4), further including a control unit that communicates with the lens, in which the control unit temporarily stores, in an internal memory, a focus position of the lens acquired via the communication, and the measurement unit associates focusing degree data obtained by AF demodulation with the focus position stored in the internal memory.

(6) The imaging device according to any one of (1) to (5), in which the measurement unit acquires the data using a captured image of a predetermined measurement chart.

(7) The imaging device according to any one of (1) to (6), further including an output unit that outputs the amount of tilt or the amount of deviation in the flange focal distance calculated by the arithmetic unit.

(8) The imaging device according to (7), in which the output unit causes a distribution of the amount of tilt to be superimposed and displayed on a captured image.

(9) The imaging device according to (8), in which the output unit causes an image in which the amount of tilt is represented by color density or color shade to be superimposed and displayed on the captured image.

(10) The imaging device according to (8) or (9), in which the output unit outputs numerical information regarding the amount of tilt or the amount of deviation in the flange focal distance in a case where the amount of tilt or the amount of deviation in the flange focal distance is out of an allowable range.

(11) The imaging device according to (2), further including a presentation unit that presents a relationship between a target focus position serving as a reference for manual operation by the user and a current focus position operated by the user.

(12) The imaging device according to (11), in which the presentation unit superimposes and displays, on a captured image, image information indicating the relationship between the target focus position and the current focus position.

(13) A method of controlling an imaging device, the method including:

a measurement step of acquiring data regarding a focus position and a focusing degree of a lens for every one of a plurality of small areas in an imaging region of an image sensor;

an arithmetic step of calculating an amount of tilt of the image sensor or an amount of deviation in a flange focal distance of the lens on the basis of a correlation of the data regarding the focus position and the focusing degree between the plurality of small areas; and an output step of outputting the amount of tilt or the amount of deviation in the flange focal distance calculated by the arithmetic unit.

REFERENCE SIGNS LIST

1 Detection system
2 Measurement chart
100 Imaging device
101 Lens
102 Image sensor
103 Front-end camera signal processing unit
103A Internal buffer
104 Video signal processing unit 111 Diaphragm
112 Shutter
113 Display unit
114 Focus ring
116 Control unit
116A Internal memory

The invention claimed is:

1. An imaging device, comprising:
a measurement circuitry configured to:
acquire data regarding a focus position and a focusing degree of a lens for each of a plurality of small areas in an imaging region of an image sensor; and
measure focusing degree data for each focus position based on AF demodulation following movement of the focus position manually operated by a user; and
an arithmetic unit configured to calculate an amount of tilt of the image sensor or an amount of deviation in a flange focal distance of the lens based on a a correlation of the data regarding the focus position and the focusing degree between the plurality of small areas.

2. The imaging device according to claim 1, wherein the measurement circuitry is further configured to acquire the data using a captured image obtained by high-speed imaging of the image sensor.

3. The imaging device according to claim 1, further comprising
a buffer configured to temporarily store an image captured by the image sensor,
wherein the measurement circuitry is further configured to execute the AF demodulation using the captured image retrieved from the buffer in time with an operation cycle of the AF demodulation.

4. The imaging device according to claim 1, further comprising
a control unit configured to:
control communication with the lens, and
store, temporarily in an internal memory, a focus position of the lens acquired via the communication; and
the measurement circuitry is further configured to associate the focusing degree data obtained by the AF demodulation with the focus position stored in the internal memory.

5. The imaging device according to claim 1, wherein the measurement circuitry is further configured to acquire the data using a captured image of a specific measurement chart.

6. The imaging device according to claim 1, further comprising an output unit configured to output the calculated amount of tilt or the calculated amount of deviation in the flange focal distance calculated by the arithmetic unit.

7. The imaging device according to claim 6, wherein the output unit is further configured to:
superimpose a distribution of the amount of tilt on a captured image; and
display the superimposed distribution.

8. The imaging device according to claim 7, wherein the output unit is further configured to:
superimpose an image in which the amount of tilt is represented by a color density or a color shade on the captured image; and
display the superimposed image.

9. The imaging device according to claim 7, wherein the output unit is further configured to output numerical information regarding the amount of tilt or the amount of deviation in the flange focal distance when the amount of tilt or the amount of deviation in the flange focal distance is out of an allowable range.

10. The imaging device according to claim 1, further comprising a presentation unit configured to present a relationship between a target focus position serving as a reference for manual operation by the user and a current focus position operated by the user.

11. The imaging device according to claim 10, wherein the presentation unit is further configured to superimpose and display, on a captured image, image information indicating the relationship between the target focus position and the current focus position.

12. A method of controlling an imaging device, the method comprising:
acquiring data regarding a focus position and a focusing degree of a lens for each of a plurality of small areas in an imaging region of an image sensor;
measuring focusing degree data for each focus position based on AF demodulation following movement of the focus position manually operated by a user;
calculating an amount of tilt of the image sensor or an amount of deviation in a flange focal distance of the lens based on a correlation of the data regarding the focus position and the focusing degree between the plurality of small areas; and
outputting the amount of tilt or the amount of deviation in the flange focal distance.

* * * * *